US010859843B1

(12) United States Patent
Tempel et al.

(10) Patent No.: US 10,859,843 B1
(45) Date of Patent: Dec. 8, 2020

(54) BACKPLATE FOR HEAD-MOUNTED DISPLAYS

(71) Applicant: Facebook Technologies, LLC, Menlo Park, CA (US)

(72) Inventors: Mark Alan Tempel, Issaquah, WA (US); James Aldrich, Mercer Island, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/594,045

(22) Filed: Oct. 6, 2019

(51) Int. Cl.
*G02B 27/01* (2006.01)
(52) U.S. Cl.
CPC ..... *G02B 27/0176* (2013.01); *G02B 27/0101* (2013.01); *G02B 27/0172* (2013.01); *G02B 2027/0138* (2013.01)
(58) Field of Classification Search
CPC ............ G02B 27/0176; G02B 27/0101; G02B 27/0172; G02B 27/017; G02B 2027/0138; G02B 2027/0178; G02B 2027/0174; G02B 2027/0116; G02B 2027/0127; G02B 2027/0154; G02B 2027/0134; G02B 5/32; G02B 23/125; G03H 1/02; G03H 2001/0212; G03H 2222/20; H04N 5/2252; H04N 5/33; H04N 13/239; H04N 13/344; H04N 13/254; H04N 13/246
See application file for complete search history.

(56) References Cited

U.S. PATENT DOCUMENTS

| 10,098,267 | B1* | 10/2018 | Janson | H04N 5/2252 |
| 2003/0178181 | A1* | 9/2003 | Noda | F28F 21/085 |
| | | | | 165/80.3 |
| 2007/0177239 | A1* | 8/2007 | Tanijiri | G03H 1/02 |
| | | | | 359/13 |
| 2016/0050345 | A1* | 2/2016 | Longbotham | G02B 27/017 |
| | | | | 348/47 |
| 2018/0123430 | A1* | 5/2018 | Wettlaufer | H02K 9/22 |
| 2019/0068860 | A1* | 2/2019 | Sakamoto | H04N 5/2252 |

* cited by examiner

*Primary Examiner* — Christopher E Leiby
(74) *Attorney, Agent, or Firm* — Fenwick & West LLP (57) ABSTRACT

A backplate for a head-mounted display (HMD) is disclosed. The backplate provides structural support as well as thermal cooling for components coupled to the backplate. The backplate includes a plurality of mounting regions that are used to couple components to the backplate. The mounting regions may include camera mounting regions (e.g., for inside-out tracking), an inertial measurement unit (IMU) mounting region, circuit board mounting regions, heat pipe mounting region, and a fan mounting region. The mounting regions may be specific to the component. In various embodiments, the backplate is a single diecast metal plate that includes the mounting regions designed to provide certain levels of thermal management, stiffness, and conductivity (e.g., ground) for the HMD.

20 Claims, 11 Drawing Sheets

BACKPLATE FOR HEAD-MOUNTED DISPLAYS

BACKGROUND

The present disclosure generally relates to head-mounted displays (HMDs), and specifically to a backplate of a HMD.

HMDs include one or more structural elements on which a plurality of components of the HMD are mounted. The structural elements are required to provide structural rigidity and durability and may include one or more plates or a shell of the HMD on which the components are mounted. As the components of HMDs become more sensitive to provide users with more sophisticated virtual environments, the structural, thermal, and electrical tolerances of the HMD have become tighter. Accordingly, a backplate that can achieve these tighter tolerance is desirable.

SUMMARY

A backplate for a head-mounted display (HMD) is disclosed. The backplate provides structural support as well as thermal cooling for components coupled to the backplate. The backplate includes a plurality of mounting regions that are used to couple components to the backplate. The mounting regions may include camera mounting regions (e.g., for inside-out tracking), an inertial measurement unit (IMU) mounting region, circuit board mounting regions, heat pipe mounting region, and a fan mounting region. The mounting regions may be specific to the component. In various embodiments, the backplate is a single diecast metal plate that includes the mounting regions designed to provide certain levels of thermal management, stiffness, and conductivity (e.g., ground) for the HMD.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Overview

A backplate for a head-mounted display (HMD) is disclosed. The backplate provides structural support as well as thermal cooling for components coupled to the backplate. The backplate includes a plurality of mounting regions that are used to couple components to the backplate. The mounting regions may include camera mounting regions (e.g., for inside-out tracking), an inertial measurement unit (IMU) mounting region, circuit board mounting regions, heat pipe mounting region, and a fan mounting region. The mounting regions may be specific to the component. In various embodiments, the backplate is a single diecast metal plate that includes the mounting regions designed to provide certain levels of thermal management, stiffness, and conductivity (e.g., ground) for the HMD.

In one embodiment, the backplate has compounding requirements for structural, thermal, precision mounting, electrical and mechanical stability requirements supporting the full functionality of the HMD while also optimizing mass of the device. Material selection and design of the backplate geometry is critical in minimizing the mass of the device to improve the comfort experienced by the user while maintaining these previously described requirements of the backplate. Additionally, the backplate is designed in such a way that it is manufacturable in mass quantities using a common diecasting process.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Inter-Pupillary Distance (IPD) Adjustment Mechanism

A head mounted display (HMD) includes a first eyecup and a second eyecup for each eye of the user. Each eyecup includes an optical assembly and an electronic display. The electronic display presents image light and the optical assembly guides the image light to an eye box of a user for viewing. The HMD includes an inter-pupillary distance (IPD) adjustment mechanism configured to change the distance between the first eyecup and the second eyecup.

Figure 1:
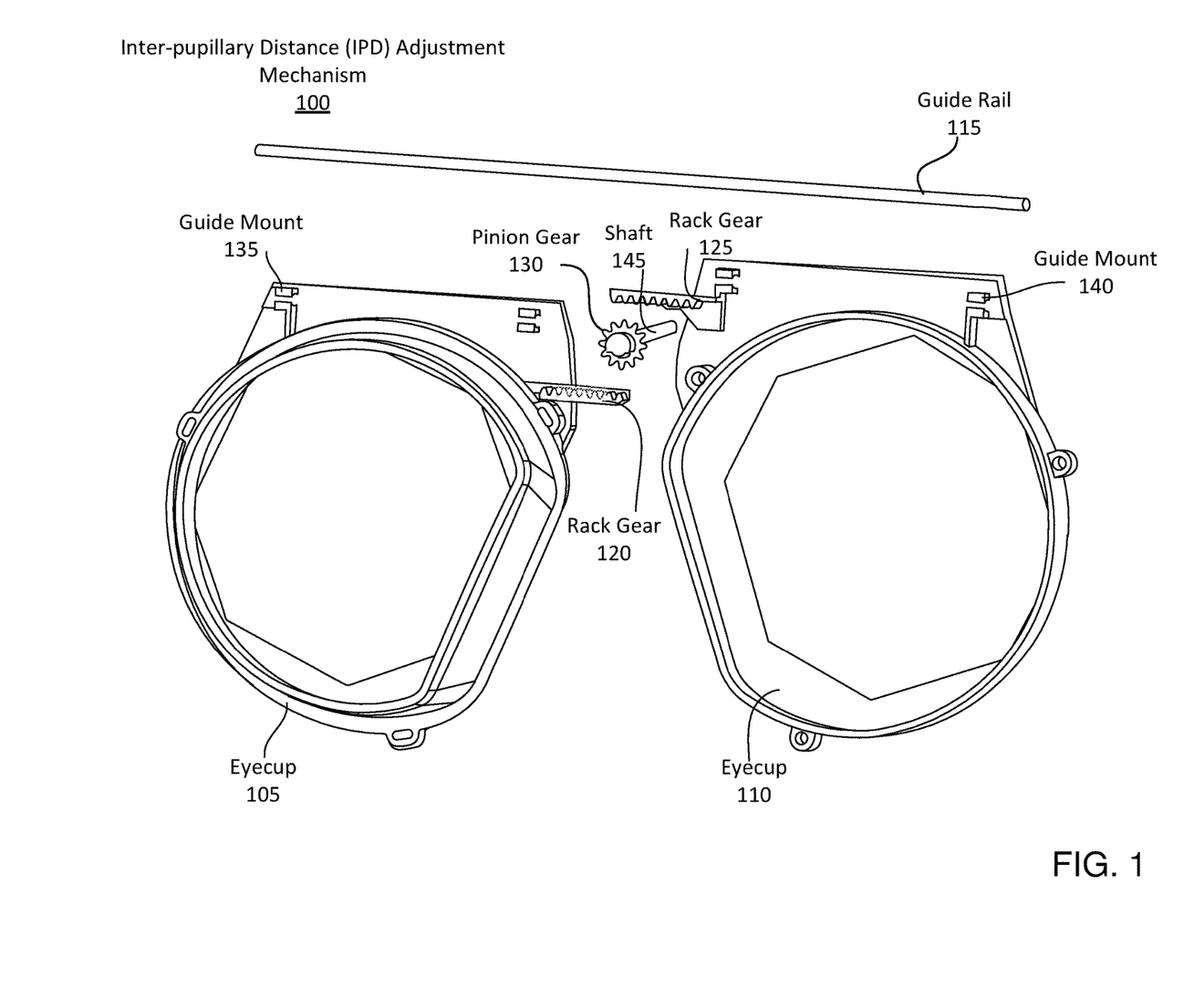
FIG. 1 is an exploded view of an inter-pupillary distance (IPD) adjustment mechanism of a head-mounted display (HMD), according to an embodiment.

FIG. 1 shows an exploded view of an IPD adjustment mechanism of a HMD, according to an embodiment. The IPD adjustment mechanism includes a first eyecup 105 and a second eyecup 110, a pinion gear 130, and a guide rail 115. The first eyecup 105 includes a rack gear 120 and a guide mount 140 and the second eyecup 110 includes a rack gear 125 and a guide mount 135. Each eyecup 105, 110 contains one or more optical elements that provide light from a corresponding display element in each eyecup. The guide rail 115 is mounted to a structural plate (not shown in FIG. 1) of the HMD and the first eyecup 105 couples to the guide rail 115 via the guide mount 135 and the second eyecup 110 couples to the guide rail 115 via the guide mount 140. The pinion gear 130 is mounted through the structural plate of the HMD and engages the rack gear 120 of the first eyecup 105 and the rack gear 125 of the second eyecup 110. Accordingly, movement of the pinion gear 130 causes the first eyecup 105 and the second eyecup 110 via engagement of the pinion gear 130 with the rack gear 120 and the rack gear 125.

Figure 2:
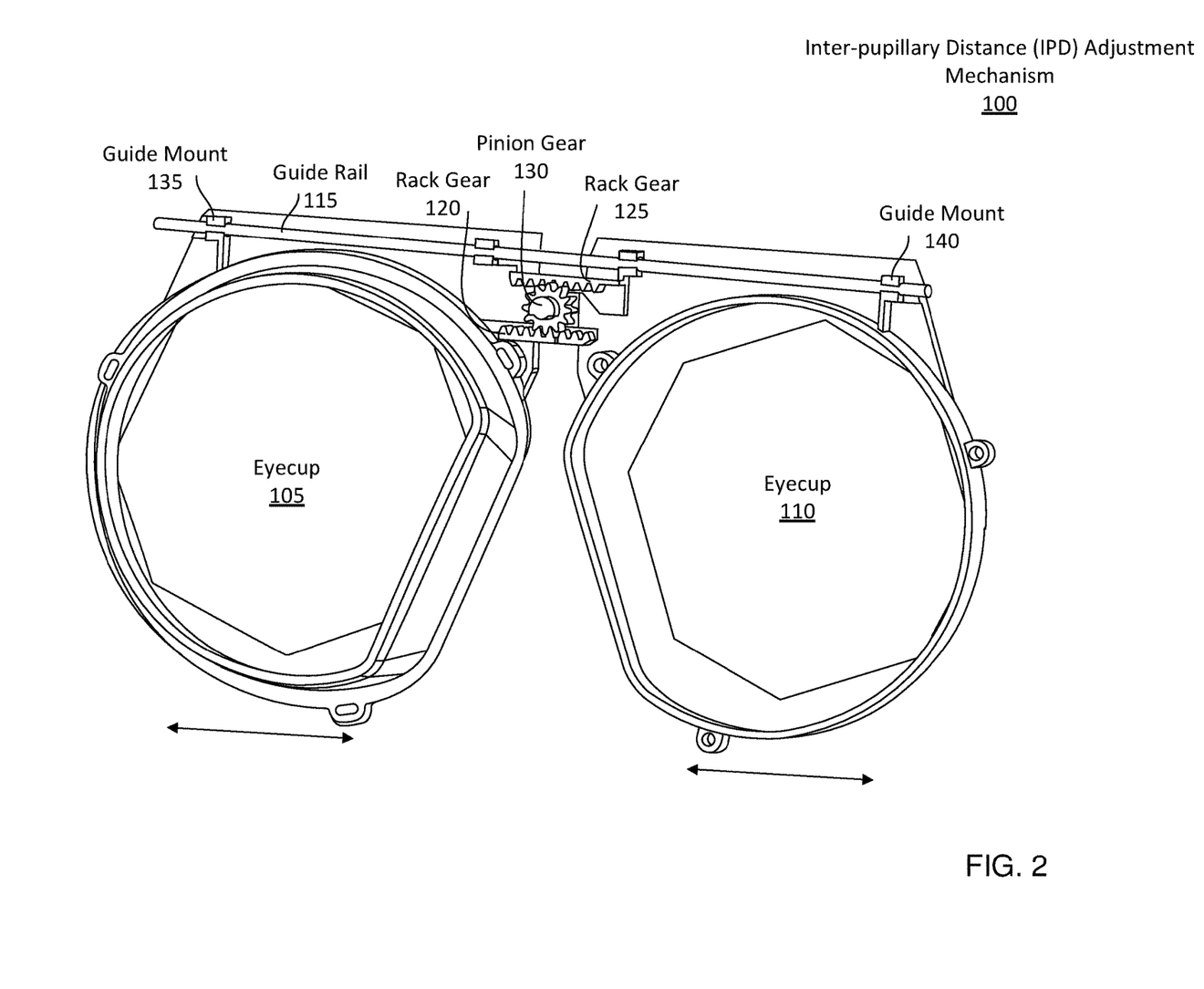
FIG. 2 is a perspective view of the IPD adjustment mechanism of FIG. 1 assembled, according to an embodiment.

FIG. 2 is a perspective view of the IPD adjustment mechanism of FIG. 1 assembled, according to an embodiment. FIG. 2 shows the first eyecup 105 slidably coupled to the guide rail 115 via a pair of guide mounts that includes guide mount 135 and the second eyecup 110 slidably coupled to the guide rail 115 via another pair of guide mounts that includes guide mount 140. Additionally, FIG. 2 shows the rack gear 120 of the first eyecup 105 and the rack gear 125 of the second eyecup 110 engaging the pinion gear 130. Accordingly, rotation of the pinion gear 130 in a first direction causes the first eyecup 105 and the second eyecup 110 to simultaneously move in opposite directions away from each other and rotation of the pinion gear 130 in a second opposite direction causes the first eyecup 105 and the second eyecup 110 to simultaneously move towards each other. For example, clockwise rotation of pinion gear 130 causes eyecup 105 to move in a −X direction and eyecup 110 to move in a +X direction (or away from each other). Similarly, counterclockwise rotation of pinion gear 130 causes eyecup 105 to move in a +X direction and eyecup 110 to move in a −X direction (or towards each other).

Figure 3:
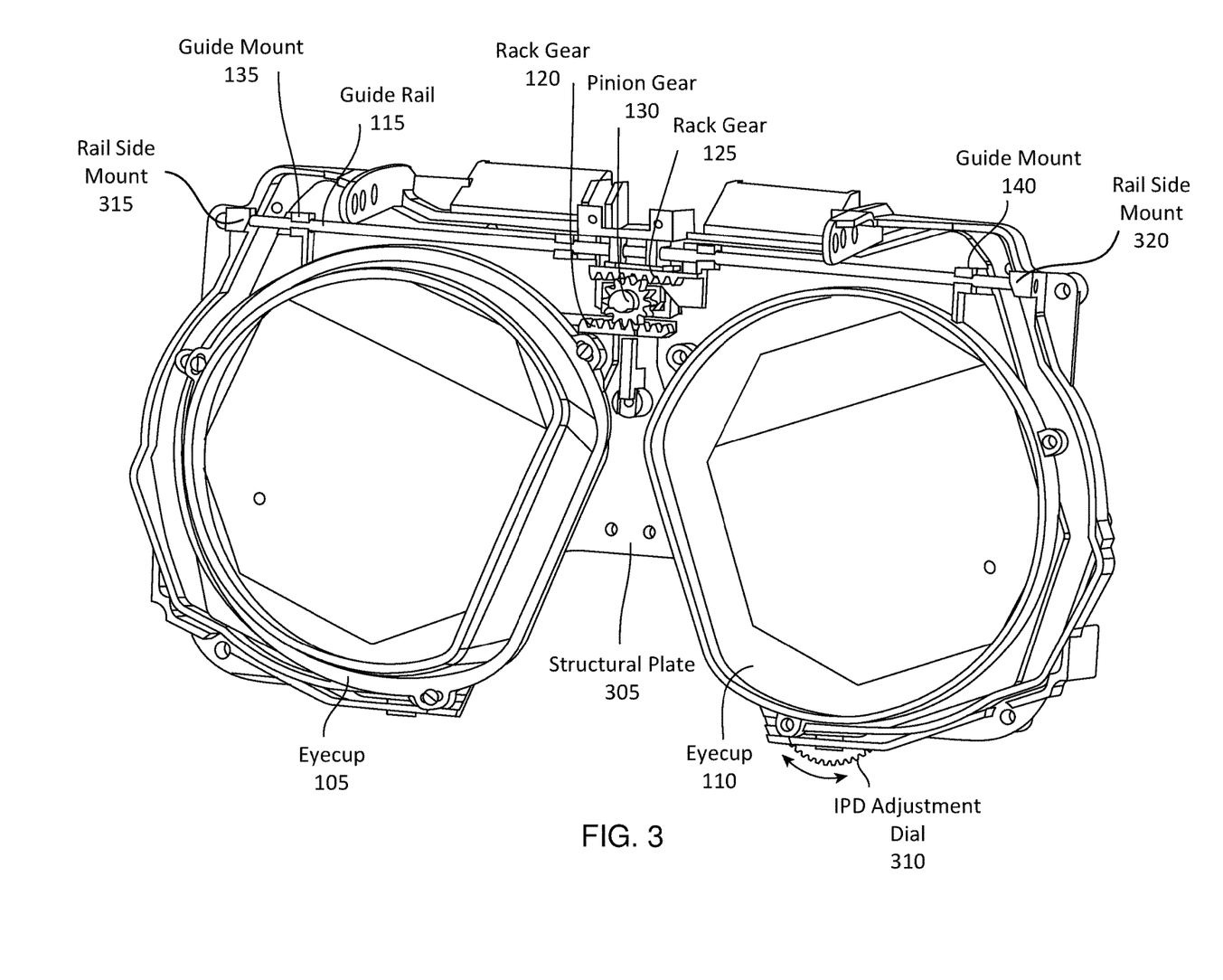
FIG. 3 is a front perspective view of the IPD adjustment mechanism mounted to a structural plate of the HMD that includes an IPD adjustment dial, according to one embodiment.

FIG. 3 is a front perspective view of the IPD adjustment mechanism mounted to a structural plate of the HMD, according to one embodiment. FIG. 3 shows a structural plate 305 of the HMD, an IPD Adjustment dial 310, and a pair of rail side mounts 315, 320. The guide rail 115 mounts to the structural plate 305 via rail side mount 315 on a first side and rail side mount 320 on a second side. In this embodiment, the guide rail 115 is located at a top portion of the structural plate 305. In other embodiments, there can be a second guide rail located at a bottom portion of the structural plate 305. In one embodiment, the structural plate 305 is a backplate of the HMD on which a plurality of components of the HMD are mounted.

FIG. 3 additionally shows an IPD Adjustment dial 310 that allows a user to adjust the distance between the first eyecup 105 and the second eyecup 110. Accordingly, rotation of the IPD Adjustment dial 310 causes rotation of the pinion gear 130 and rotation of the pinion gear 130 causes movement of the first eyecup 105 and the second eyecup 110, as discussed above. The connection between the IPD Adjustment dial 310 and the pinion gear 130 will be discussed in FIG. 4.

Figure 4:
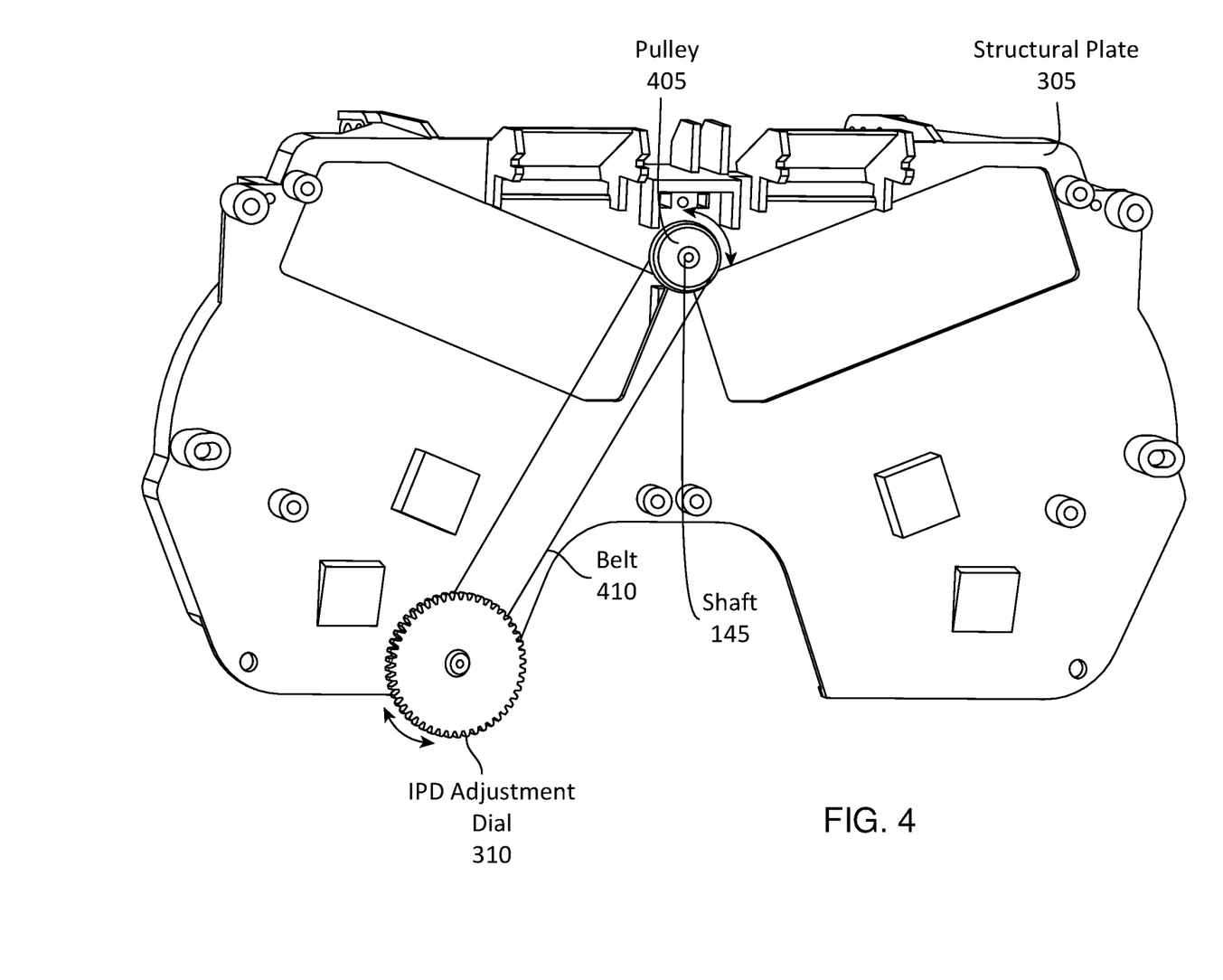
FIG. 4 is a rear perspective view of the structural plate of the HMD showing backside components of the IPD adjustment mechanism, according to one embodiment.

FIG. 4 is a rear perspective view of the structural plate 305 showing backside components of the IPD adjustment mechanism, according to one embodiment. FIG. 4 shows a pulley 405 and a belt 410 of the IPD adjustment mechanism on a backside of the structural plate 305. The pulley 405 is connected to the pinion gear 130 via shaft 145 through the structural plate 305. The pulley 405 is also connected to IPD adjustment dial 310 via belt 410. Thus, as a user turns the IPD adjustment dial 310, the pulley 405 turns via engagement between the IPD adjustment dial 310 and the belt 410. In this embodiment, the belt 410 allows the IPD adjustment dial 310 to coincide with the location of a user's thumb when they move their hand up to touch the HMD while wearing it. Thus, the IPD adjustment dial 310 could be placed in other locations on the HMD and, in other locations, the belt 410 may not be necessary. For example, the IPD adjustment dial 310 could be located on an opposite end of shaft 145 from pinion gear 130 or rotationally connected to shaft 145 via one or more intermediate gears.

Figure 5:
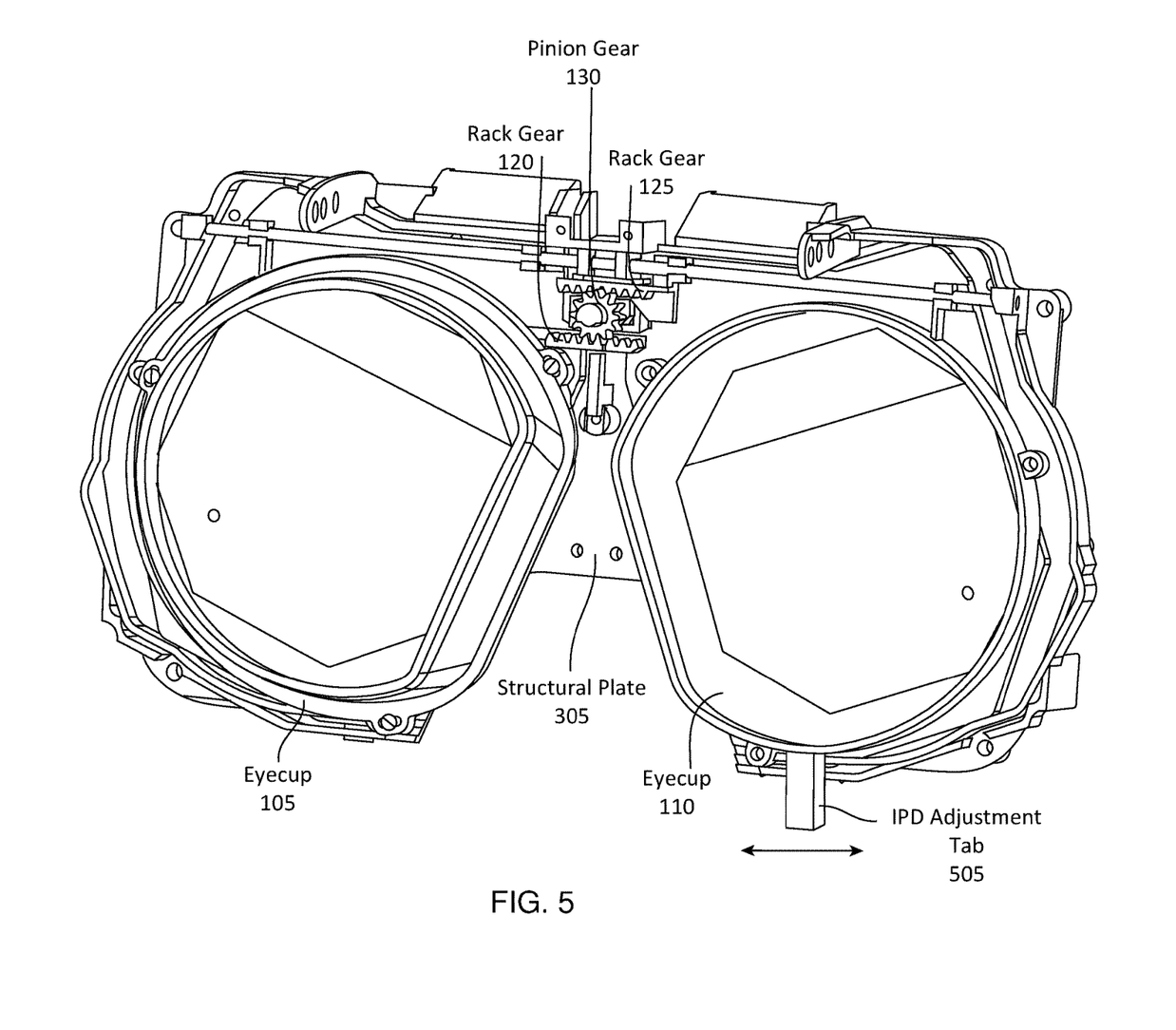
FIG. 5 is a front perspective view of the IPD adjustment mechanism mounted to a structural plate of the HMD that includes an IPD adjustment tab, according to one embodiment.

FIG. 5 is a front perspective view of the IPD adjustment mechanism that includes an IPD adjustment tab 505, according to one embodiment. In this embodiment, a tab (or other protruding element) extends from one of the eyecups 105, 110 to allow a user to provide a force to manually move one of the eyecups with their fingers. Based on the gearing between the pinion gear 130 and the rack gears 120, 125, movement of one eyecup causes reciprocal movement of the other eyecup. Thus, a user manually moving the second eyecup 110 via the IPD adjustment tab 505 also cause the first eyecup to move to adjust the inter-pupillary distance. In one embodiment, the IPD adjustment tab 505 extends beyond a body of the HMD to allow the user to move the IPD adjustment tab 505. The body of the HMD at the location of the IPD adjustment tab 505 includes a hole to allow the IPD adjustment tab 505 to extend through. The body of the HMD at the location of the IPD adjustment tab 505 may also include a recess or cavity for the IPD adjustment tab 505 such that the IPD adjustment tab 505 is flush with and does not stick out from the body of the HMD while also allowing the user to engage the IPD adjustment tab 505 to change the inter-pupillary distance. The IPD adjustment tab 505 can be located in other positions on the HMD, such as the top of the HMD, on a front face or edge of the HMD, and so forth.

In other embodiments, the guide rail 115 is a threaded rod that has left handed threads on one end and right-handed threads on the other end. Accordingly, one eyecup (e.g., eyecup 105) includes a nut (e.g., in place of guide mount 135) that mates with the left-handed threads and the other eyecup (e.g., eyecup 110) includes a nut (e.g., in place of guide mount 140) that mates with the right-handed threads. Thus, when the guide rail 115 is rotated, the eyecups move either towards or away from each other depending on the direction of rotation. This approach provides mechanical advantage and can be self-locking.

In another embodiment, the IPD adjustment mechanism includes two pined linkages between the eyecups 105 and 110. Accordingly, moving a common pin (coupled to and between the two linkages) in the vertical direction causes the eyecups 105 and 110 to move horizontally either towards each other or away from each other, depending on whether the common pin is moved up or down. In one embodiment, moving the common pin upward causes the eyecups 105 and 110 to move horizontally toward each other. Thus, in this embodiment, moving the common pin downward causes the eyecups 105 and 110 to move horizontally away from each other. Accordingly, this IPD adjustment mechanism includes guide rail 115 to constrain the eyecups to move horizontally and the common pin is restrained to move vertically.

In another embodiment, the IPD adjustment mechanism includes a belt with two pulleys. One eyecup is attached to one side of the belt and the other eyecup is attached to the other side of the belt. Accordingly, when one of the pulleys is rotated, the belt moves and the eyecups move in opposite directions.

Backplate

Figure 6:
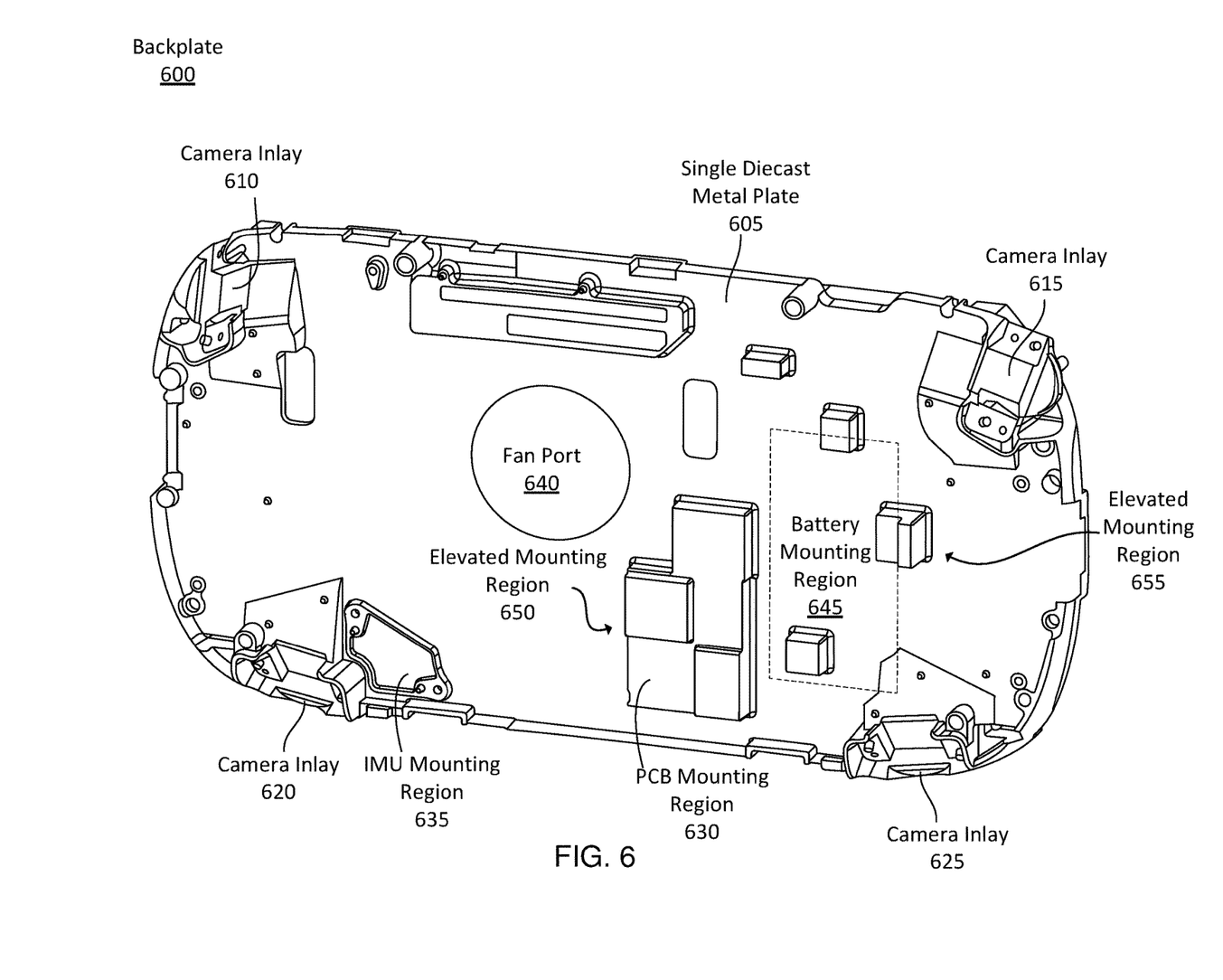
FIG. 6 is a front perspective view of a structural backplate of a HMD, according to one embodiment.

FIG. 6 is a front perspective view of a structural backplate 600 of a HMD, according to one embodiment. FIG. 6 shows a single diecast metal plate 605 that includes molded camera inlays 610, 615, 620, 625, an inertial measurement unit (IMU) mounting region 635, a fan port 640, and a plurality of elevated mounting regions 650, 655 for a battery mounting region 645 and a printed circuit board (PCB) mounting region 630. The backplate 600 can provide structural support, thermal cooling, and operate as an electrical ground for components mounted to the backplate 600.

The single diecast metal plate 605 operates as the main structural support of the HMD. The HMD uses inside-out tracking where multiple cameras and an IMU for a ground truth comparison are used to determine the HMD's position and/or orientation. The cameras are located within the molded camera inlays 610, 615, 620, 625 looking out to determine how the HMD's position changes in relation to the environment. Thus, as the HMD moves, the HMD readjusts its location and/or orientation in the environment based on readings from the cameras and IMU and the virtual scene presented to the user adjusts accordingly in real-time. The IMU is used as a backup tracking mechanism and its data is used as a ground truth comparison for the cameras. Since the reliability of the tracking data is critical for the HMD's performance and the user's experience, tight tolerances are required with respect to any movement of the cameras or the IMU over the lifetime of the HMD. For example, minor changes in location (e.g., a bend in the frame, loosening of the mounts, etc.) of one or more cameras or to the IMU can cause the HMD tracking to become unreliable. Thus, structural rigidity is an important consideration since unreliable tracking quickly degrades the user's experience. As a result, a single piece of metal is used, in one embodiment, to maintain a tight positional relationship between the cameras and the IMU. Drop testing from various heights has been demonstrated using a single piece of metal for the backplate 600, such a magnesium, aluminum, and so forth. In one embodiment, the single diecast metal plate 605 is made from magnesium AZ91D.

The single diecast metal plate 605 also operates as a heat sink that includes both active and passive cooling elements. In some embodiments, all processing components are mounted to the single diecast metal plate 605. This makes heat a relevant consideration in choosing a material for the backplate 600. In other embodiments, a subset of the processing components are mounted to the single diecast metal plate 605. Accordingly, the passive cooling elements include features that can be diecast into the plate to increase thermal spreading. These passive cooling features include elevated mounting regions 650, 655 that elevate heat producing elements, such as the battery and PCB. Elevating these components increases airflow around and under them and the elevated mounting regions 650, 655 increase the surface area between the heat producing elements and other adjacent elements that allows these components to dissipate more heat than they would otherwise if they were not elevated. Accordingly, the elevated mounting region 650 corresponds to the PCB mounting region 630 and the elevated mounting region 655 corresponds to the battery mounting region 645. In other embodiments, the single diecast metal plate 605 can be formed with heat sink fin structures to increase radiant cooling.

Additionally, the positions of the components relative to each other can be chosen to minimize the heat exposure to the more heat sensitive components (e.g., IMU) from adjacent components. In one embodiment, the arrangement of components on the backplate 600 is chosen based on an optimization that maximizes the distance between the highest heat producing elements. In other embodiments, the optimization uses both how much heat a particular element produces and how sensitive a particular element is to heat for its operation into account when determining the layout.

The active cooling element of the HMD is a fan or blower. FIG. 6 shows a fan port 640 in the single diecast metal plate 605. The fan port 640 is configured to mount a fan thereon and the fan is configured to draw air from the cavity of the HMD created for the user's nose between the eyes of the user. The fan pulls air from the nose cavity of the HMD into the body of the HMD to internally circulate air and cool the cameras, PCB, battery, IMU, and other components of the HMD.

Moreover, the HMD may include a heat pipe connected to one or more high heat producing elements (e.g., PCB, battery, etc.) at one end and to the single diecast metal plate 605 at the other. In one embodiment, the heat pipe operates as a heat transfer from the one or more high heat producing elements to a portion of the single diecast metal plate 605 where heat is less or a concern. Not only does the heat pipe itself operate as a heat sink that is air cooled by the fan, it is configured to transfer heat to another portion of the single diecast metal plate 605.

The single diecast metal plate 605 also operates as an electrical and electromagnetic field (EMF) ground for components of the HMD. In one embodiment, the single diecast metal plate 605 includes a passivation layer to prevent corrosion. In order to make a better ground point, pads are laser etched into the single diecast metal plate 605 to remove the passivation layer. Accordingly, each component is electrically grounded to the single diecast metal plate 605 through a pad.

Figure 7:
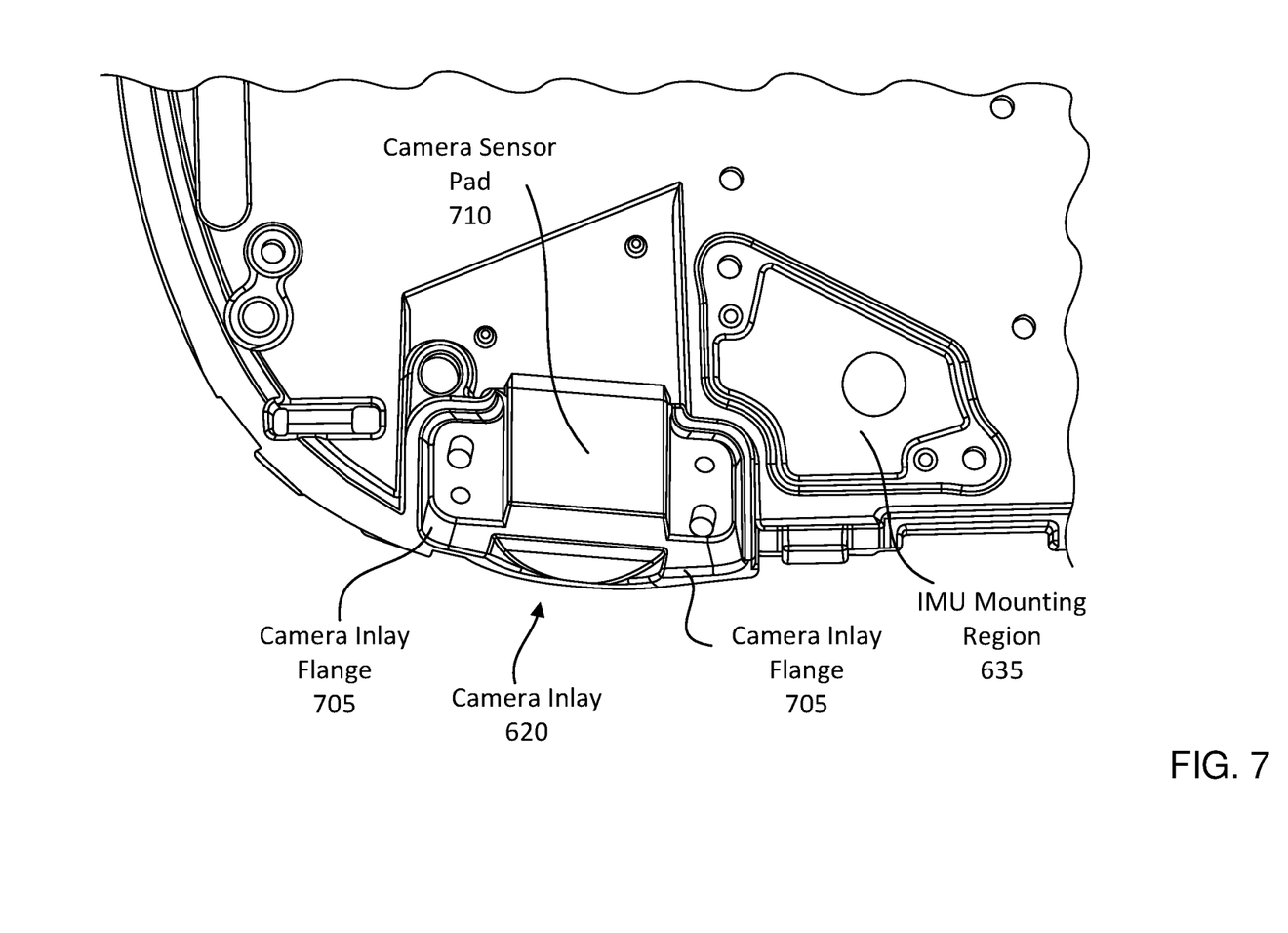
FIG. 7 is a rear perspective view of a structural backplate of a HMD, according to one embodiment.

FIG. 7 is close-up view of the camera inlay 620 and the IMU mounting region 635 of the backplate 600, according to one embodiment. The camera inlay 620 includes a camera inlay flange 705 and camera sensor pad 710. The camera inlay flange 705 protects the camera in case the HMD is dropped and ensures that the critical camera components do not take the brunt of the fall. Instead, any impulse force applied to the camera area on the body of the HMD would be transferred through the camera inlay flange 705 to the single diecast metal plate 605.

FIG. 7 also shows the IMU mounting region 635 as an elevated portion of the backplate 635. As described above, the IMU is a sensitive component and the additional material of the elevated portion of the IMU mounting region 635 operates to add structural rigidity and dissipate heat. Moreover, the IMU is located away from other noisy components or magnetic materials (e.g., PCB, battery, etc.) and it can be beneficial to have the LMU close to a camera. For example, the camera to IMU position relationship needs to be stable over time to ensure accurate tracking data. IMU provides ground truth tracking data to the camera tracking system. Thus, any bending or distortion of the backplate 600 puts stress on the IMU and can cause the tracking data to be off.

Figure 8:
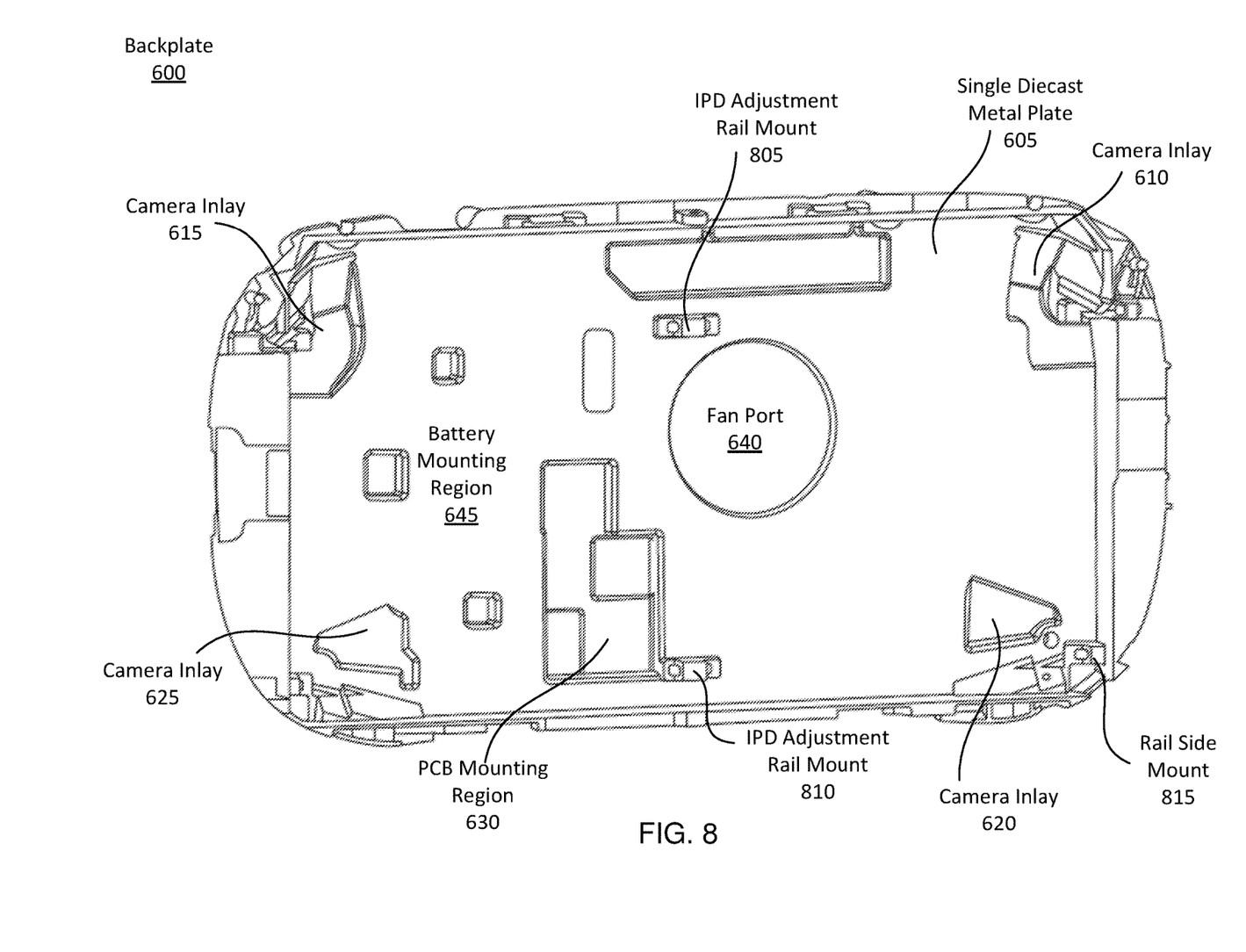
FIG. 8 is a rear perspective view of a structural backplate of a HMD that includes an IPD guide rail, according to one embodiment.

FIG. 8 is a rear perspective view of backplate 600 of a HMD, according to one embodiment. FIG. 8 shows the backside recesses created by the camera inlays 610, 615, 620, 625, the elevated mounting region 650 of the PCB mounting region 630, and the elevated mounting region 655 of the battery mounting region 645. FIG. 8 also shows top inter-pupillary distance (IPD) adjustment rail mount 805, bottom IPD adjustment rail mount 810, and rail side mount 815 for mounting an IPD adjustment mechanism.

Figure 9:
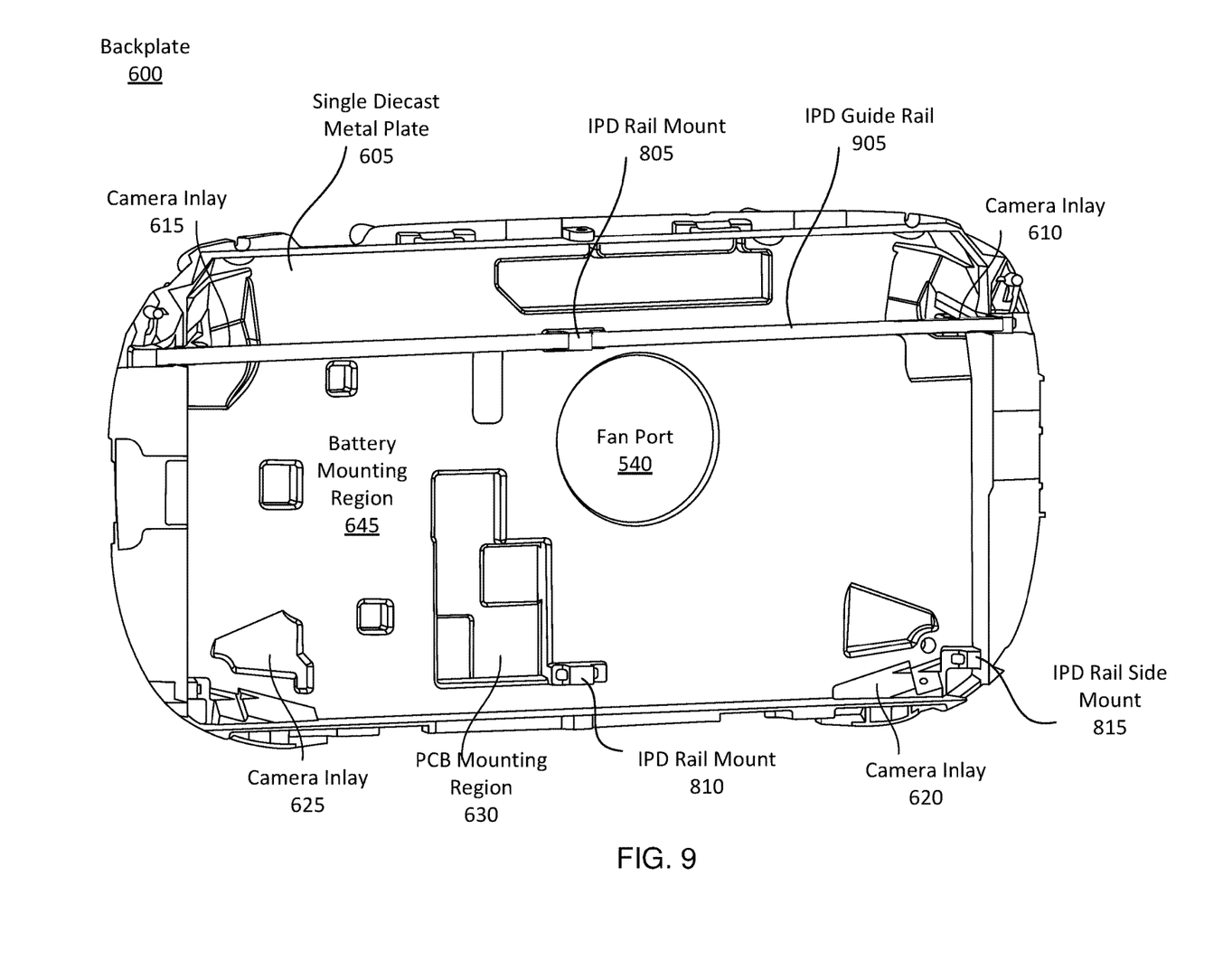
FIG. 9 is close-up view of a camera inlay and inertial measurement unit (IMU) mounting region of the structural backplate, according to one embodiment.

FIG. 9 shows another rear perspective view of backplate 600 that includes an IPD guide rail 905, according to one embodiment. While FIG. 9 only shows a single IPD guide rail 905 located at the top portion of the backplate 600, it should be understood that a second IPD guide rail could be located at the bottom portion of the backplate 600 where the bottom IPD adjustment rail mount 810, and rail side mount 815 are located.

As discussed above with respect to FIGS. 1-5, an IPD adjustment mechanism can be mounted to the single diecast metal plate 605 of the HMD. For example, the eyecups can each be mounted on the IPD guide rail 905 to allow the eyecups to adjust a distance between the eyecups. Accordingly, movement of the pinion gear causes both eyecups to move either away from or towards each other via engagement with the corresponding rack gear of each eyecup.

Accordingly, other components can also be mounted to the single diecast metal plate 605. For example, one or more antennas, universal serial bus (USB) port, a power button, and speaker volume buttons can also mount directly to the single diecast metal plate 605. Additionally, the outside housing of the HMD is also mounted to the single diecast metal plate 605.

A Head Mounted Display (HMD)

Figure 10:
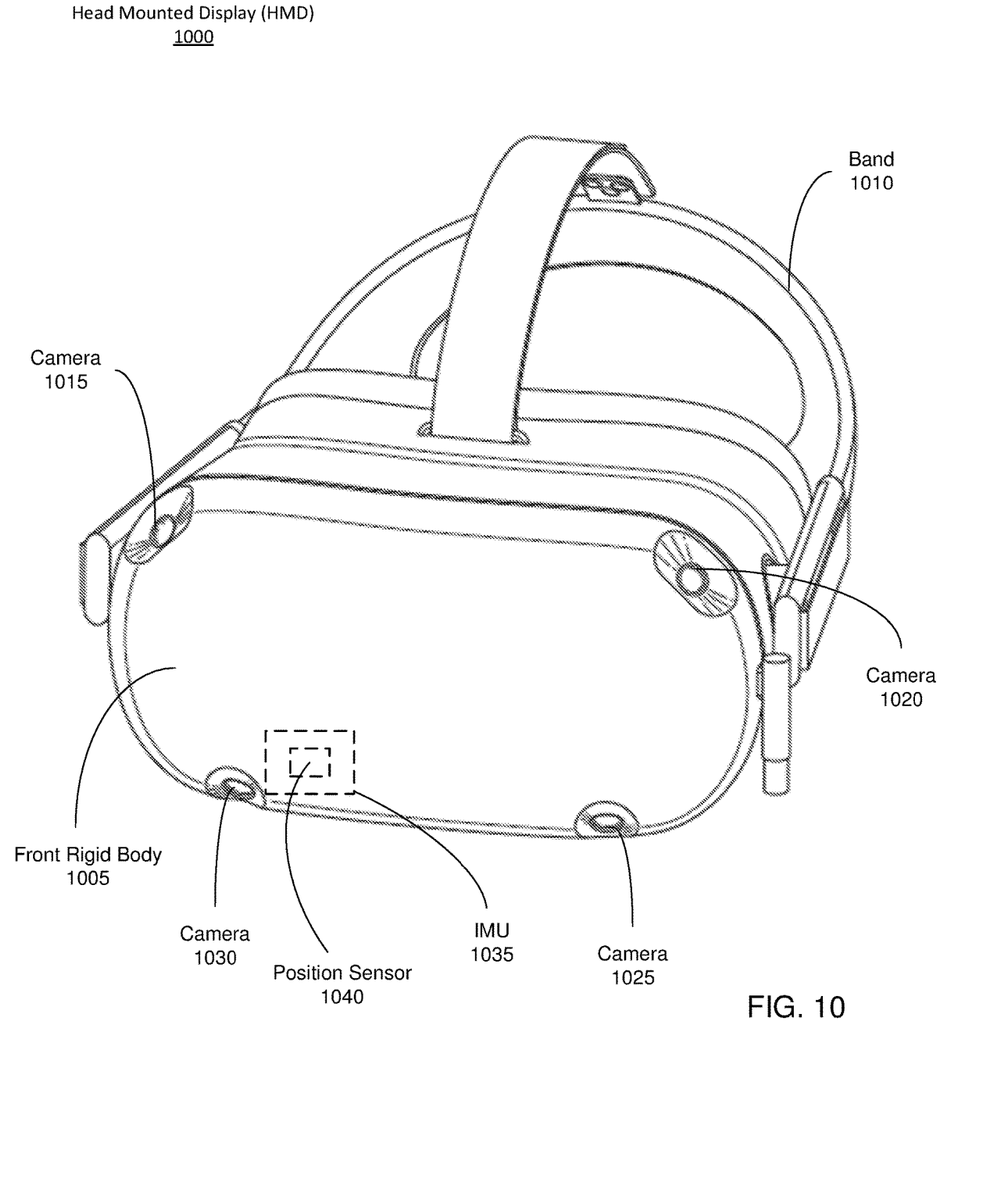
FIG. 10 is a perspective view of a HMD, in accordance with an embodiment.

FIG. 10 is a perspective view of a HMD, in accordance with an embodiment. The HMD 1000 may be part of, e.g., an artificial reality system. The HMD 10000 includes a front rigid body 1005, a band 1010, and an HMD controller (not shown). In the embodiment of FIG. 10, the HMD 1000 includes an imaging assembly, which includes a camera 1015, a camera 1020, a camera 1025, and a camera 1030, which are positioned on the front rigid body 1005.

The front rigid body 1005 includes one or more electronic display elements (not shown in FIG. 10), one or more integrated eye tracking systems (not shown in FIG. 10), an Inertial Measurement Unit (IMU) 1035, and one or more position sensors 1040. In the embodiment shown by FIG. 10, the position sensors 1040 are located within the IMU 1035, and neither the IMU 1035 nor the position sensors 1040 are visible to a user of the HMD 10000. The IMU 1035 is an electronic device that generates fast calibration data based on measurement signals received from one or more of the position sensors 1040. A position sensor 1040 generates one or more measurement signals in response to motion of the HMD 10000. Examples of position sensors 1040 include: one or more accelerometers, one or more gyroscopes, one or more magnetometers, another suitable type of sensor that detects motion, a type of sensor used for error correction of the IMU 1035, or some combination thereof. The position sensors 1040 may be located external to the IMU 1035, internal to the IMU 1035, or some combination thereof.

The imaging assembly generates image information using images and/or audio information captured from a local area surrounding the HMD 10000. The local area is the environment that surrounds the HMD 10000. For example, the local area may be a room that the user wearing the HMD 10000 is inside, or the user may be outside and the local area is an outside area that is visible to the HMD 10000. The image assembly comprises the cameras 1015, 1020, 1025, 1030 positioned to capture a portion of the local area. Image information may include, e.g., one or more images, audio information (e.g., sounds captured by one or more microphones), video information, metadata, or some combination thereof. Image information may include depth information of one or more objects in the local area and/or amount of light detected by the cameras 1015, 1020, 1025, 1030. In the embodiment of FIG. 10, the imaging assembly includes the cameras 1015, 1020, 1025, 1030.

The cameras 1015, 1020, 1025, 1030 are configured to capture images and/or video of different portions of the local area. Each camera 1015, 1020, 1025, 1030 includes a sensor (not shown), a lens, and a camera controller (not shown). The sensor is an electrical device that captures light using an array of photo-sensitive pixels (e.g., complementary metal oxide, charged coupled display, etc.), wherein each pixel converts light into an electronic signal. Sensors can have varying features, such as resolution, pixel size and sensitivity, light sensitivity, type of shutter, and type of signal processing. The lens is one or more optical elements of a camera that facilitate focusing light on to the sensor. Lenses have features that can be fixed or variable (e.g., a focus and an aperture), may have varying focal lengths, and may be covered with an optical coating. In some embodiments, one or more of the cameras 1015, 1020, 1025, 1030 may have a microphone to capture audio information. The microphone can be located within the camera or may located external to the camera.

Each camera 1015, 1020, 1025, 1030 has a field of view that represents a region within the local area viewable by the camera. In the embodiment of FIG. 10, the field of view of each camera 1015, 1020, 1025, 1030 can range between 50-180 degrees. A field of view ranging from ~50 to 120 degrees is generally referred to as a wide field of view, and a field of view larger than 120 degrees is generally referred to as a fish eye field of view. In the embodiment of FIG. 10, the lens of each camera 1015, 1020, 1025, 1030 may have a same or different degree of field of view. For example, the cameras 115, 120, 125, 130 may have a field of view ranging between 120 to 180 degrees. In the embodiment of FIG. 1, each of the cameras 115, 120, 125, 130 has a 150 degree field of view. Having a 150 degree field of view rather than, e.g., a 180 degree field of view allows each camera to sit flush with the surface of the front rigid body 105 or inset into the front rigid body 105, which may help protect the cameras 115, 120, 125, 130 from damage. Various fields of views may provide different types of coverage between the cameras 115, 120, 125, 130 (e.g., monocular regions, overlapping regions, stereoscopic regions, etc.).

In addition to the field of view of each camera, the position and orientation of each camera 1015, 1020, 1025, 1030 allows the type of coverage between the cameras to be controlled. The desired type of coverage may be based on the type of desired information to be gathered from the captured images. In the embodiment of FIG. 10, the cameras 1015, 1020 are positioned at the upper corners of the front rigid body 1005 and are oriented to point outwards and upwards towards the sides and top of the front rigid body 1005. In this configuration, cameras 1015, 1020 have separate fields of view, providing monocular regions of coverage. The cameras 1025, 1030 are positioned along the bottom edge of the front rigid body 1005 and are oriented to point downwards and parallel (or nearly parallel) to each other. In this configuration, cameras 1025, 1030 have overlapping fields of view, providing stereoscopic regions of coverage. The cameras 115, 120, 125, 130 may have overlapping regions of coverage between the fields of view of the cameras, which allows details from each field of view to be handed over such that frames from the cameras 1015, 1020, 1025, 1030 may be stitched together. In other embodiments, the field of view, position, and orientation of the cameras 1015, 1020, 1025, 1030 may vary to provide different types of coverage.

The HMD controller is configured to determine depth information for one or more objects in the local area based on one or more captured images from the imaging assembly. Depth information may be determined by measuring the distance to an object using received information about the object's position. In the embodiment of FIG. 10, the HMD controller determines the depth information of objects using the stereoscopic regions of coverage from the cameras 1015, 1020, 1025, 1030. The objects within the overlapping regions of fields of view are viewed by more than one camera, which provides more than one perspective of each object. By calculating the relative difference of an object's position between the different perspectives, the HMD controller determines the distance of the object to the imaging assembly. In some embodiments, depth information may be determined by measuring the distance to an object by sending signals (e.g., structured light, radio signals, ultrasound, etc.) to the object. In one embodiment, the imagining assembly is a depth camera assembly (DCA).

The HMD controller is additionally configured to update a local area model for the HMD 1000. The local area model includes depth information, exposure settings, or some combination thereof of the environment surrounding the HMD 10000. In the embodiment of FIG. 10, the local area model represents a mapping function of depth information and exposure settings of the environment of the HMD 1000 based on the location of the HMD 1000 within the environment. The location of the HMD 1000 within the environment is determined from the depth information gathered from the captured images of the imaging assembly. The local area model provides the exposure settings for each camera 1015, 1020, 1025, 1030 for different positions of the cameras within the environment and allows the exposure settings to be adjusted as the location and orientation of the HMD 1000 changes within the environment. Using the local area model and position information from the IMU 1035 (e.g., velocity vector, acceleration vector, etc.), the HMD controller predicts a future location and orientation of the HMD 1000. Subsequently, using the local area model, the HMD controller determines the appropriate exposure settings for the predicted future location and orientation of the HMD 1000. Based on the predicted location and orientation and the determined exposure settings, the HMD controller then generates imaging instructions for each camera 1015, 1020, 1025, 1030. The imaging instructions specify at which time and at which exposure settings each camera 1015, 1020, 1025, 1030 captures images. In this configuration, the HMD 1000 does not have to continually get information from each camera 1015, 1020, 1025, 1030 to determine each camera's exposure settings and the location of the HMD 1000. As the location and orientation of the HMD 1000 change within the environment, the HMD controller may update the local area model using depth information and exposure settings from the imaging assembly. In some embodiments, the HMD controller may update a depth model and a separate exposure model. Additionally, functionality described in conjunction with one or more of the components shown in FIG. 10 may be distributed among the components in a different manner than described in conjunction with FIG. 10 in some embodiments. For example, functions performed by the HMD controller may be performed by the camera controllers, or vice versa.

Figure 11:
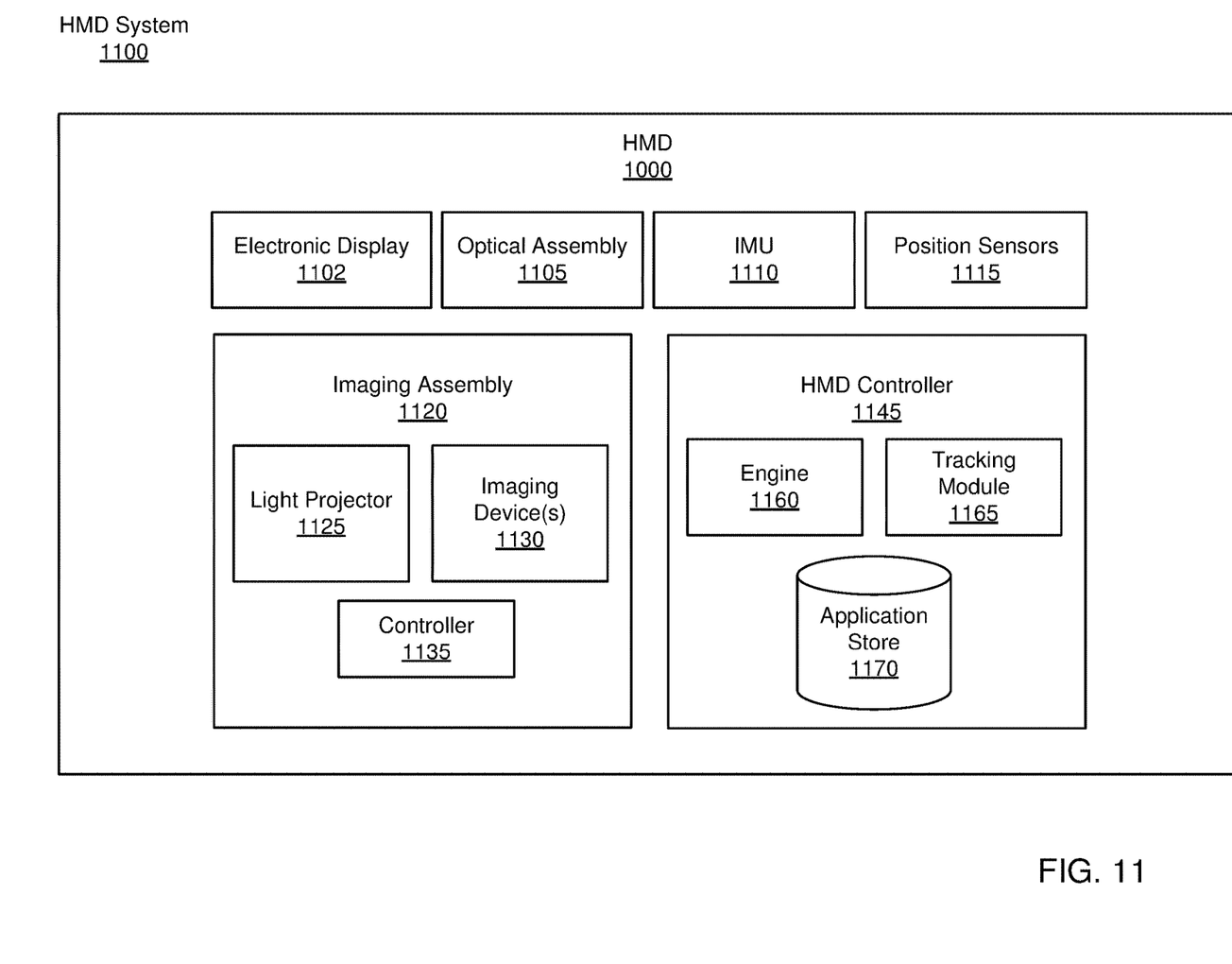
FIG. 11 is a block diagram of an HMD system, in accordance with an embodiment.

FIG. 11 is a block diagram illustrating an embodiment of an HMD system 1100, according to one embodiment. The HMD system 1100 may operate in an artificial reality system environment. The HMD system 1100 shown by FIG. 11 comprises the HMD 1000 that is associated with a peripheral device 1180. While FIG. 11 shows an example HMD system 1100 including one HMD 1000, in other embodiments any number of these components may be included in the HMD system 1100. For example, there may be multiple HMDs 1000 each communicating with respective peripheral devices 1180. In alternative configurations, different and/or additional components may be included in the HMD system 1100. Additionally, functionality described in conjunction with one or more of the components shown in FIG. 11 may be distributed among the components in a different manner than described in conjunction with FIG. 11 in some embodiments.

The HMD 1000 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 1000 and presents audio data based on the audio information The HMD 1000 includes an imaging assembly 1120, an electronic display 1102, an optical assembly 1105, one or more position sensors 1115, an IMU 1110, an optional eye tracking system (not shown), an optional varifocal module (not shown), and an HMD controller 1145. Some embodiments of the HMD 1000 have different components than those described in conjunction with FIG. 11. Additionally, the functionality provided by various components described in conjunction with FIG. 11 may be differently distributed among the components of the HMD 1000 in other embodiments.

The imaging assembly 1120 captures data describing depth information of a local area surrounding some or all of the HMD 1000. The imaging assembly 1120 includes one or more cameras located on the HMD 1000 that capture images and/or video information and/or audio information. In some embodiments, the imaging assembly 1120 can compute the depth information using the data (e.g., based on captured images having stereoscopic views of objects within the local area). In addition, the imaging assembly 1120 determines the amount of light detected by each camera in the imaging assembly 1120. The imaging assembly 1120 may send the depth information and amount of light detected to the HMD controller 1145 for further processing. The imaging assembly 1120 is an embodiment of the imaging assembly in FIG. 10.

The electronic display 1102 displays 2D or 3D images to the user in accordance with data received from the imaging assembly controller. In various embodiments, the electronic display 1102 comprises a single electronic display or multiple electronic displays (e.g., a display for each eye of a user). Examples of the electronic display 1102 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, or some combination thereof.

The optical assembly 1105 magnifies image light received from the electronic display 1102, corrects optical errors associated with the image light, and presents the corrected image light to a user of the HMD 1000. The optical assembly 1105 includes a plurality of optical elements. Example optical elements included in the optical assembly 1105 include: an aperture, a Fresnel lens, a convex lens, a concave lens, a filter, a reflecting surface, or any other suitable optical element that affects image light. Moreover, the optical assembly 1105 may include combinations of different optical elements. In some embodiments, one or more of the optical elements in the optical assembly 1105 may have one or more coatings, such as partially reflective or anti-reflective coatings.

The IMU 1110 is an electronic device that generates data indicating a position of the HMD 1000 based on measurement signals received from one or more of the position sensors 1115 and from depth information received from the imaging assembly 1120. A position sensor 330 generates one or more measurement signals in response to motion of the HMD 1000. Examples of position sensors 1115 include: one or more accelerometers, one or more gyroscopes, one or more magnetometers, another suitable type of sensor that detects motion, a type of sensor used for error correction of the IMU 1110, or some combination thereof. The position sensors 1115 may be located external to the IMU 1110, internal to the IMU 1110, or some combination thereof.

Based on the one or more measurement signals from one or more position sensors 1115, the IMU 1110 generates data indicating an estimated current position of the HMD 1000 relative to an initial position of the HMD 1000. For example, the position sensors 1115 include multiple accelerometers to measure translational motion (forward/back, up/down, left/right) and multiple gyroscopes to measure rotational motion (e.g., pitch, yaw, roll). In some embodiments, the IMU 1110 rapidly samples the measurement signals and calculates the estimated current position of the HMD 1000 from the sampled data. For example, the IMU 1110 integrates the measurement signals received from the accelerometers over time to estimate a velocity vector and integrates the velocity vector over time to determine an estimated current position of a reference point on the HMD 1000. The reference point is a point that may be used to describe the position of the HMD 1000. The reference point may generally be defined as a point in space or a position related to the HMD's orientation and position.

The IMU 1110 receives one or more parameters from the HMD controller 1145. The one or more parameters are used to maintain tracking of the HMD 1000. Based on a received parameter, the IMU 1110 may adjust one or more IMU parameters (e.g., sample rate). In some embodiments, certain parameters cause the IMU 1110 to update an initial position of the reference point so it corresponds to a next position of the reference point. Updating the initial position of the reference point as the next calibrated position of the reference point helps reduce accumulated error associated with the current position estimated the IMU 1110. The accumulated error, also referred to as drift error, causes the estimated position of the reference point to "drift" away from the actual position of the reference point over time. In some embodiments of the HMD 1000, the IMU 1110 may be a dedicated hardware component. In other embodiments, the IMU 1110 may be a software component implemented in one or more processors.

The HMD controller 1145 processes content for the HMD 1000 based on information received from the imaging assembly 1120. In the example shown in FIG. 11, the HMD controller 1145 includes an application store 1170, a tracking module 1165, and an engine 1160. Some embodiments of the HMD controller 1145 have different modules or components than those described in conjunction with FIG. 3. Similarly, the functions further described below may be distributed among components of the HMD controller 1145 in a different manner than described in conjunction with FIG. 3.

The application store 1170 stores one or more applications for execution by the HMD controller 1145. An application is a group of instructions, that when executed by a processor, generates content for presentation to the user. Content generated by an application may be in response to inputs received from the user via movement of the HMD 1000 or a peripheral device. Examples of applications include: gaming applications, conferencing applications, video playback applications, or other suitable applications.

The tracking module 1165 calibrates the HMD system 1100 using one or more calibration parameters and may adjust one or more calibration parameters to reduce error in determination of the position of the HMD 1000. For example, the tracking module 1165 communicates a calibration parameter to the imaging assembly 1120 to adjust the focus of the imaging assembly 1120 to more accurately determine positions of objects captured by the imaging assembly 1120. Calibration performed by the tracking module 1165 also accounts for information received from the IMU 1110 in the HMD 1000.

The tracking module 1165 tracks movements of the HMD 1000 using information from the imaging assembly 1120, the one or more position sensors 1115, the IMU 1110 or some combination thereof. For example, the tracking module 1165 determines a position of a reference point of the HMD 1000 in a mapping of a local area based on information from the imaging assembly 1120. The tracking module 1165 may also determine positions of the reference point of the HMD 1000. Additionally, in some embodiments, the tracking module 1165 may use portions of data indicating a position or the HMD 1000 from the IMU 1110 as well as representations of the local area from the imaging assembly 1120 to predict a future location of the HMD 1000. The tracking module 1165 provides the estimated or predicted future position of the HMD 1000 to the engine 1160.

The engine 1160 processes information (e.g., depth and/or exposure) received from the imaging assembly 1120. Using the received information, the engine 1160 synchronizes the exposure settings for the cameras of the imaging assembly 1120. As described with regards to FIG. 1, the exposure settings of each camera in the imaging assembly 1120 are aligned about the center time point such that images captured by the imaging assembly 1120 are information-rich and of the same frame. To center the exposure lengths of the cameras in the imaging assembly 1120, the engine 1160 determines the midpoint of the exposure length of each camera and aligns the midpoints about the center time point.

The engine 1160 may additionally use information from the tracking module 1165 in conjunction with the local area model. Using information from the tracking module 1165, the engine 1160 can predict a future location and orientation of the HMD 1000. Subsequently using the local area model, the engine 1160 determines the appropriate exposure settings for each camera in the imaging assembly 1120 for the predicted future location and orientation of the HMD 1000. The local area model allows the engine 1160 to efficiently adjust exposure settings of the cameras in the imaging assembly 1120 such that the engine 1160 does not have to analyze the depth information and amount of light detected by the imaging assembly 1120 at each new location and/or orientation of the HMD 1000. As the location and orientation of the HMD 1000 changes within the environment, the engine 1160 may update the local area model using depth information and amount of light detected from the imaging assembly 1120. Additionally, the imaging assembly 1120 may be configured to send depth information and amount of light detected to the engine 1160 at certain time intervals to account for any changes in the level of light that may have occurred within the environment and to ensure that the local area model is updated accordingly.

The engine 1160 also executes applications within the HMD system 1100 and receives position information, acceleration information, velocity information, predicted future positions, or some combination thereof, of the HMD 1000 from the tracking module 1165. Based on the received information, the engine 1160 determines content to provide to the electronic display 1102 for presentation to the user. For example, if the received information indicates that the user has looked to the left, the engine 1160 generates content for the electronic display 1102 that mirrors the user's movement in a virtual environment or in an environment augmenting the local area with additional content.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A structural plate of a head mounted display (HMD) comprising:
    a single diecast metal plate configured to provide structural rigidity for the HMD, the single diecast metal plate configured to have a plurality of components of the HMD mounted thereon and operate as a heat sink for at least one of the plurality of components, the single diecast metal plate including a plurality of molded camera inlays diecast into the single diecast metal plate, each of the molded camera inlays configured to receive a camera and to provide drop protection to the camera.

2. The structural plate of claim 1, wherein the single diecast metal plate is further configured to operate as a main ground for the plurality of components of the HMD.

3. The structural plate of claim 1, wherein the plurality of components include at least a printed circuit board (PCB), a battery, an inertial measurement unit (IMU), and a pair of eyecups that each include an electronic display and a lens assembly.

4. The structural plate of claim 1, further comprising:
    a mounting region that includes additional material in a location on the single diecast metal plate corresponding to a location for receiving an inertial measurement unit (IMU), wherein the IMU is sensitive to mounting changes relative to the single diecast metal plate over time and the additional material of the mounting region provides additional structural support and stiffness to the single diecast metal plate for the mounting region at the location.

5. The structural plate of claim 1, wherein the HMD includes active and passive cooling, wherein the single diecast metal plate operating as the heat sink provides the passive cooling for the plurality of components of the HMD.

6. The structural plate of claim 5, further comprising:
    a fan mounting region that includes a port configured to receive a fan configured to provide the active cooling for the HMD, wherein the fan is configured to pull air from a nose cavity of the HMD into a body of the HMD.

7. The structural plate of claim 1, wherein the plurality of molded camera inlays each include side flanges that extend at least flush with a surface of a camera when mounted to the single diecast metal plate to provide drop protection for the camera.

8. The structural plate of claim 1, further comprising:
    a plurality of elevated mounting regions, wherein the single diecast metal plate includes a plurality of elevated protrusions configured to elevate heat producing components of the HMD.

9. The structural plate of claim 1, wherein the single diecast metal plate is a magnesium alloy.

10. The structural plate of claim 1, wherein the plurality of components of the HMD further include at least one guide rail of an inter-pupillary distance (IPD) adjustment assembly, wherein the at least one guide rail is configured to guide movement of a pair of eyecups of the HMD to adjust to an inter-pupillary distance of a user.

11. A head mounted display (HMD) comprising:
at least one processor;
a single diecast metal plate configured to provide structural rigidity for the HMD;
a pair of eyecups, each eyecup corresponding to an eye of a user and including an electronic display and an optics block; and
a plurality of cameras mounted to the single diecast metal plate via a plurality of molded camera inlays configured to provide drop protection to the plurality of cameras.

12. The HMD of claim 11, further comprising:
an inter-pupillary distance (IPD) adjustment assembly including at least one guide rail mounted to the single diecast metal plate, the IPD adjustment assembly configured to adjust to an inter-pupillary distance for the user by moving the pair of eyecups.

13. The HMD of claim 11, wherein the single diecast metal plate is further configured to operate as a main ground for the at least one processor, the plurality of cameras, and a battery of the HMD.

14. The HMD of claim 11, wherein the single diecast metal plate further comprises a mounting region that includes additional material in a location on the single diecast metal plate corresponding to a location for mounting an inertial measurement unit (IMU), wherein the IMU is sensitive to mounting degradation changes relative to the single diecast metal plate over time and the additional material of the mounting region provides additional structural support and stiffness to the single diecast metal plate in the location.

15. The HMD of claim 11, wherein the plurality of molded camera inlays each include side flanges that extend at least flush with a surface of a camera when mounted to the single diecast metal plate that are configured to provide drop protection for the camera.

16. The HMD of claim 11, wherein the single diecast metal plate includes a plurality of elevated mounting regions configured to elevate heat producing components of the HMD, wherein the heat producing elements at least include a battery and a printed circuit board (PCB) of the HMD.

17. The HMD of claim 11, wherein the single diecast metal plate is a magnesium alloy.

18. The HMD of claim 11, wherein the single diecast metal plate operates as a heat sink for the at least one processor, the plurality of cameras, and a battery of the HMD.

19. The HMD of claim 18, wherein the HMD includes active and passive cooling, wherein the single diecast metal plate operating as the heat sink provides the passive cooling for the at least one processor, the plurality of cameras, and the battery of the HMD.

20. The HMD of claim 19, wherein the single diecast metal plate further comprises a fan mounting region that includes a port configured to receive a fan configured to provide the active cooling for the HMD, wherein the fan is configured to pull air from a nose cavity of the HMD into a body of the HMD.

* * * * *

UNITED STATES PATENT AND TRADEMARK OFFICE
CERTIFICATE OF CORRECTION

PATENT NO. : 10,859,843 B1
APPLICATION NO. : 16/594045
DATED : December 8, 2020
INVENTOR(S) : Mark Alan Tempel et al.

Page 1 of 1

It is certified that error appears in the above-identified patent and that said Letters Patent is hereby corrected as shown below:

In the Claims

In Column 14, Claim 2, Line 29, delete "operate as a main" and insert -- operate as the main --, therefor.

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*